US012566723B1

(12) United States Patent
Tozzi et al.

(10) Patent No.: US 12,566,723 B1
(45) Date of Patent: Mar. 3, 2026

(54) RAPID SERIAL DATA OUT (RSDO) BACKDOOR ENABLING SPI COMMUNICATION

(71) Applicant: Allegro MicroSystems, LLC, Manchester, NH (US)

(72) Inventors: Leandro Tozzi, Buenos Aires (AR); Matias Marando, Buenos Aires (AR); Nicolás Ronis, Buenos Aires (AR)

(73) Assignee: Allegro MicroSystems, LLC, Manchester, NH (US)

( * ) Notice: Subject to any disclaimer, the term of this patent is extended or adjusted under 35 U.S.C. 154(b) by 0 days.

(21) Appl. No.: 18/816,513

(22) Filed: Aug. 27, 2024

(51) Int. Cl.
G06F 13/42 (2006.01)
G06F 1/26 (2006.01)

(52) U.S. Cl.
CPC .......... G06F 13/4282 (2013.01); G06F 1/266 (2013.01)

(58) Field of Classification Search
CPC .............................. G06F 13/4282; G06F 1/266
USPC ......................................................... 710/313
See application file for complete search history.

(56) References Cited

U.S. PATENT DOCUMENTS 4,344,132 A * 8/1982 Dixon ........................ G06F 5/06
710/60
5,572,058 A * 11/1996 Biard ..................... H10N 59/00
257/E27.005

8,122,159 B2 2/2012 Monreal
9,552,315 B2 1/2017 Monreal
10,718,794 B2 7/2020 El Bacha et al.
11,368,533 B2 6/2022 Kozomora et al.
11,621,657 B1 4/2023 Foletto et al.
11,894,844 B1 * 2/2024 Hein ................ H03K 19/17744
11,972,154 B2 4/2024 Hein
12,107,710 B2 10/2024 Casu et al.

FOREIGN PATENT DOCUMENTS

CN 1365007 A * 8/2002 ......... G01R 33/1253
CN 101226517 A * 7/2008
CN 201130344 Y * 10/2008
CN 102023956 A * 4/2011
JP H01238339 A * 9/1989

* cited by examiner

*Primary Examiner* — Pierre Vital
(74) *Attorney, Agent, or Firm* — DALY, CROWLEY, MOFFORD & DURKEE LLP

(57) ABSTRACT

Rapid-data-transfer sensor arrays include a controller and a plurality of sensor integrated circuits (ICs) connected in series and configured to periodically take measurements and provide measurement data to the controller as serial data. The sensor IC includes a power regulation circuit configured to selectively supply power for a low-power mode and an active mode for recording data and an internal shift register. When finished with the measurement, the sensor IC is configured to provide measurement data to the shift register for transfer to the controller. The controller is configured to initiate serial transfer of data from each of the shift registers of the first plurality of sensor ICs to the controller. Switching functionality provides the capability to switch sensors or sensor ICs from one operational mode to another, e.g., from a rapid serial data out (RDSO) mode to an SPI mode.

40 Claims, 10 Drawing Sheets

600

612

SDO/
MISO

610   SCLK

614

Volatile memory (12 bits)
604

606

Shift register (N bits), circuit
enabled in sleep mode
616    602

ST/DN (CS) 620

SDI (MOSI)

SPI

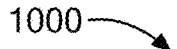

1000

Providing a main controller configured to receive serial data

1002

Providing a first plurality of sensor integrated circuits (ICs) connected in series and configured to wake from a sleep mode and take measurements in an active mode and to provide measurement data to the main controller as serial data

1004

Providing a protocol switch, for each sensor IC, configured to switch a communication protocol mode of the sensor IC from a rapid serial data data output (RSDO) mode to a serial peripheral interface (SPI) mode

1006

Wherein the main controller is configured to provide a control signal to each sensor IC to switch functionality from RSDO mode to SPI mode and/or vice versa

1008

Wherein each sensor IC includes a transducer, a shift register, a serial-data-in (SDI) pin, a serial-data-out (SDO) pin, a bi-directional chip select (CS) pin, a power regulation circuit configured to selectively supply power for the sleep mode and the active mode, and a clock pin for receiving a clock (SCLK) signal from the controller

RAPID SERIAL DATA OUT (RSDO) BACKDOOR ENABLING SPI COMMUNICATION

BACKGROUND

Sensor arrays with multiple sensors operate to take sensor measurements over a distributed area. Numerous types of sensors can be used in arrays and sensor arrays can be used in many various applications. Examples include imaging arrays for digital cameras, photodetector arrays for automotive lidar systems, arrays of magnetic field sensors for monitoring circuit elements or moving magnetic targets, temperature sensor arrays for monitoring temperatures over a distributed area, as well as many others.

Existing sensor arrays typically operate in a system by having a sensor in the array provide interrupts to a system controller based on a sensor reading exceeding a set threshold. For such systems, however, the system controller typically must read back the data from each sensor by commanding a serial read or performing an ADC conversion for the sensor. The system controller must perform such a data read on all of the sensors in the array in order to determine the output of the sensor array.

When reading or "scanning" measurement data from multiple sensors in such sensor arrays, it is often a system design requirement for the system controller to read the data from the multiple sensors within a short time. Such a design constraint typically requires sensor arrays systems to employ significant computational power, e.g., high-speed processors capable of many million instructions per second (MIPS), and system resources like high-speed analog-to-digital-converters (ADCs). Both approaches drive up system complexity and cost and can introduce issues related to high-clock speeds, e.g., transient signals, phase noise, and jitter.

SUMMARY

Aspects of the present disclosure are directed to and include a rapid-data-transfer, a.k.a., rapid serial data output (RSDO), sensor arrays including switching mechanisms that allow switching between an RSDO communication mode (protocol) and a serial peripheral interface (SPI) communication mode (protocol).

One general aspect of the present disclosure includes a switchable-protocol rapid-data-transfer sensor array. The switchable-protocol rapid-data-transfer sensor array can include: a controller configured to receive serial data; a first plurality of sensor integrated circuits (ICs) connected in series and configured to wake from a low-power mode and take measurements in an active mode and to provide measurement data to the controller as serial data, where each sensor IC includes a protocol switch configured to switch a communication protocol mode used by the sensor IC between a rapid serial data output (RSDO) mode employing an RSDO protocol and a serial peripheral interface (SPI) mode employing an SPI protocol, and where the protocol switch is configured to switch functionality from the RSDO mode to the SPI mode in response to a control signal from the controller.

Implementations may include one or more of the following features. Each sensor IC may include a transducer, a shift register, a power regulation circuit configured to selectively supply power for the low-power mode and the active mode, and a serial or SPI clock (SCLK) pin for receiving a serial (SPI) clock signal (SCLK) from the controller, where for the RSDO mode, each sensor IC includes a serial-data-in (SDI)

pin, a serial-data-out (SDO) pin, a bi-directional chip select (CSN) pin, and where the controller is connected to the CSN pin of each of the first plurality of sensor ICs by a first CSN line configured with a pull-up resistor, and where the controller is configured to provide a clock signal on the SPI clock (SCLK) pin to initiate serial transfer of data from each of the shift registers of the first plurality of sensor ICs to the respective SDO pins for data transfer to the controller. The bi-directional CSN pin may be configured to activate the sensor IC from the low-power mode in which the CSN pin is in a high state into the active mode in which the CSN pin is in a low state for a measurement by the transducer, where the sensor IC is configured to pull the bi-directional CSN pin to a low state when performing the measurement and to release the bi-directional CSN pin and enter the low-power mode after finishing the measurement, and where, when finished with the measurement, the sensor IC is configured to provide measurement data to the shift register for transfer to the controller.

Each of the sensor ICs may include an internal pull-down open drain switch configured to pull the CSN pin to a low state while the sensor IC is in the active mode. Each sensor IC may be configured to store measurement data in the shift register in response to a transition on the CSN pin from a low state to a high state. Each sensor IC may be configured to receive serial data provided at the SDI pin and, when the serial clock (SCLK) signal is received on a (SCLK) clock line from the controller, store the serial data in the shift register. The power regulation circuit of each sensor IC may include an internal timer configured to wake from the low-power mode based on a timing provided by the internal timer. Each sensor IC can include an internal oscillator producing an internal system (CLK) clock signal. The sensor array may include a second plurality of sensor ICs connected in series and configured to periodically take measurements and provide measurement data to the controller as serial data. The controller may be configured to activate one of the sensor ICs from the low-power mode to the active mode by pulling down the CSN line. Each sensor IC may be configured, when a sensor measurement threshold is exceeded, to pull the CSN pin to a low state for a fixed amount of time before releasing the CSN pin and entering the low-power mode.

The protocol switch may include: a logic gate configured in the RSDO mode to receive a chip select (CSN) signal from the chip select (CSN) line, a serial clock (SCLK) signal from the serial clock (SCLK) line, and a serial-data-in (SDI) signal from the SDI line as inputs, and provide an output indicative of a low state on all three lines; a synchronizer configured to receive the output of the logic gate and a system clock (CLK) signal (referring to the clock signal produced by the internal oscillator of the sensor IC device) and produce a synchronizer output signal; and a counter configured to receive the synchronizer output signal after being passed through an inverting input, and produce a counter output signal when a true condition for the logic gate persists for a specified counter value; where the controller is configured to receive the counter output signal and, in response, produce a control signal to switch the protocol used by the first plurality of sensor ICs from the RSDO protocol to the SPI protocol. The counter may be configured to produce the counter output signal in response to the CSN, SDI, and SCLK signals being at zero for a predetermined duration.

The first plurality of sensor ICs may be connected in a serial daisy chain configuration. The first plurality of sensor ICs may include a plurality of sensors. The plurality of sensors may include a plurality of magnetic field sensors. The plurality of magnetic field sensors may include Hall effect elements. The Hall effect elements may include vertical Hall effect elements. The vertical Hall effect elements are configured to detect key-movement of keys of the keyboard. The plurality of magnetic field sensors may include magnetoresistance (xMR) elements. The first plurality of sensor ICs may include one or more temperature sensors. The first plurality of sensor ICs may include one or more current sensors.

Another general aspect of the present disclosure includes a method of making a switchable-protocol rapid-data-transfer RSDO sensor array. The method can include: providing a controller configured to receive serial data; providing a first plurality of sensor integrated circuits (ICs) connected in series and configured to wake from a low-power mode and take measurements in an active mode and to provide measurement data to the controller as serial data, and providing each sensor IC with a protocol switch configured to switch a communication protocol mode used by the sensor IC between a rapid serial data output (RSDO) mode employing an RSDO protocol and a serial peripheral interface (SPI) mode employing an SPI protocol, and where the protocol switch is configured to switch functionality from the RSDO mode to the SPI mode in response to a control signal from the controller.

Implementations may include one or more of the following features. Each sensor IC provided by the method may include a transducer, a shift register, and a power regulation circuit configured to selectively supply power for the low-power mode and the active mode, and a serial (SPI) clock (SCLK) pin for receiving a serial (SPI) clock (SCLK) signal from the controller, where for the RSDO mode, each sensor IC includes a serial-data-in (SDI) pin, a serial-data-out (SDO) pin, a bi-directional chip select (CSN) pin, and where the controller is connected to the CSN pin of each of the first plurality of sensor ICs by a first CSN line configured with a pull-up resistor, and where the controller is configured to provide a SPI clock signal on the serial clock (SCLK) pin to initiate serial transfer of data from each of the shift registers of the first plurality of sensor ICs to the respective SDO pins for data transfer to the controller. The CSN pin may be configured to activate the sensor IC from the low-power mode in which the CSN pin is in a high state into the active mode in which the CSN pin is in a low state for a measurement by the transducer, where the sensor IC is configured to pull the bi-directional CSN pin to the low state when performing the measurement and to release the bi-directional CSN pin and enter the low-power mode after finishing the measurement, and where, when finished with the measurement, the sensor IC is configured to provide measurement data to the shift register for transfer to the controller.

Each of the sensor ICs may include an internal pull-down open drain switch configured to pull the bi-directional CSN pin to a low state while the sensor IC is in the active mode. Each sensor IC can include an internal oscillator producing an internal system (CLK) clock signal. Each sensor IC may be configured to store measurement data in the shift register in response to a transition on the CSN pin from a low state to a high state. Each sensor IC may be configured to receive serial data provided at the SDI pin and, when a serial clock (SCLK) signal is received on the serial clock (SCLK) pin from the controller, store the serial data in the shift register. The power regulation circuit of each sensor IC may include an internal timer configured to wake from the low-power mode based on a timing provided by the internal timer. The method may include providing a second plurality of sensor ICs connected in series and configured to periodically take measurements and provide measurement data to the controller as serial data. The controller may be configured to activate one of the sensor ICs from the low-power mode to the active mode by sending a polling signal on the CSN line. Each sensor IC may further be configured to, when a sensor measurement threshold is exceeded, pull the CSN pin to a low state for a fixed amount of time before releasing the CSN pin and entering the low-power mode.

The protocol switch, provided by the method, may include: a logic gate configured to receive a chip select (CSN) signal from a chip select (CSN) line, an SPI or serial clock (SCLK) signal from clock (SCLK) line, and a serial-data-in (SDI) signal from an SDI line as inputs, and provide an output indicative of a low state on all three lines; a synchronizer configured to receive the output of the logic gate and a system clock (CLK) signal (referring to the clock signal produced by the internal oscillator of the sensor IC device); and a counter configured to receive the output of the synchronizer as a counter input signal passed through an inverting input, and produce a counter output signal when a true condition for the logic gate persists for a specified counter value; and where the controller is configured to receive the counter output signal of the counter and, in response, produce a control signal to switch the protocol used by the first plurality of sensor ICs from the RSDO protocol to the SPI protocol.

The counter may be configured to produce the counter output signal in response to the CSN, SDI, and CLK signals being at zero for a predetermined duration. The first plurality of sensor ICs may be connected in a serial daisy chain configuration. The first plurality of sensor ICs may include one or more sensors. The one or more sensors may include one or more magnetic field sensors. The one or more magnetic field sensors may include one or more Hall effect elements. The one or more magnetic field sensors may include a plurality of vertical Hall effect elements. The plurality of vertical Hall effect elements are configured to detect key-movement of keys of the keyboard. The one or more magnetic field sensors may include one or more magnetoresistance (xMR) elements. The first plurality of sensor ICs may include one or more temperature sensors. The first plurality of sensor ICs may include one or more current sensors.

Implementations of the described systems/techniques may include hardware, a method or process, or computer software on a computer-accessible medium. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the operations and/or actions, e.g., as described herein for embodiments of the present disclosure.

The features and advantages described herein are not all-inclusive; many additional features and advantages will be apparent to one of ordinary skill in the art in view of the drawings, specification, and claims. Moreover, it should be noted that the language used in the specification has been selected principally for readability and instructional purposes, and not to limit in any way the scope of the present disclosure, which is susceptible of many embodiments. What follows is illustrative, but not exhaustive, of the scope of the present disclosure.

BRIEF DESCRIPTION OF THE DRAWINGS

The manner and process of making and using the disclosed embodiments may be appreciated by reference to the figures of the accompanying drawings. In the figures like reference characters refer to like components, parts, elements, or steps/actions; however, similar components, parts, elements, and steps/actions may be referenced by different reference characters in different figures. It should be appreciated that the components and structures illustrated in the figures are not necessarily to scale, emphasis instead being placed upon illustrating the principals of the concepts described herein. Furthermore, embodiments are illustrated by way of example and not limitation in the figures, in which:

FIG. 8 is a timing diagram illustrating time-multiplexing of data readback for an example sensor array having three chains of sensor devices, in accordance with the present disclosure;

FIG. 10 is a block diagram of an example method of rapid serial data transfer for a sensor array, in accordance with the present disclosure.

DETAILED DESCRIPTION

Figure 1:
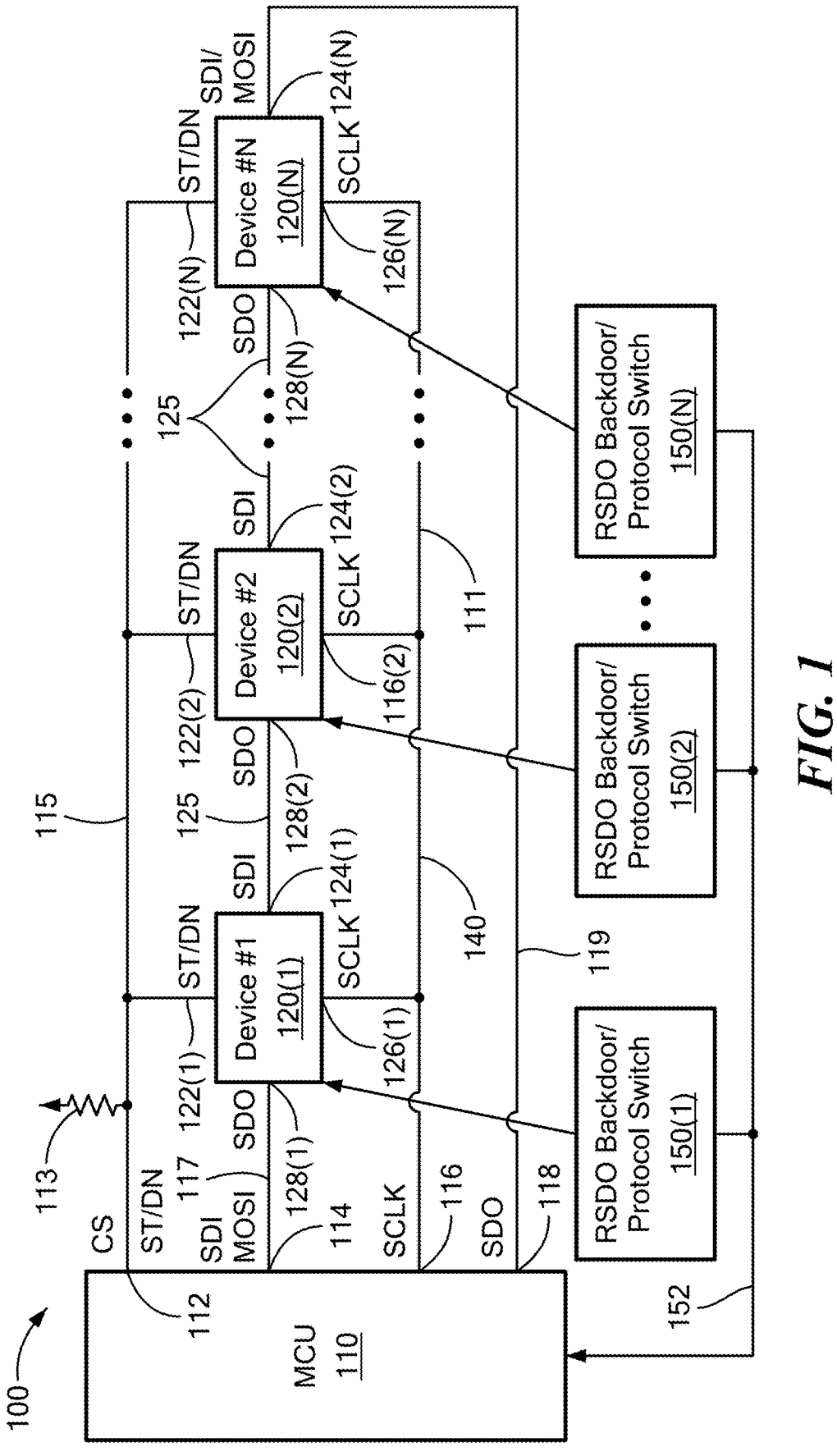
FIG. 1 is a block diagram of an example sensor array employing RSDO backdoor mechanisms, in accordance with the present disclosure.

The features and advantages described herein are not all-inclusive; many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The subject technology is susceptible of many embodiments. What follows is illustrative, but not exhaustive, of the scope of the subject technology.

Prior to describing examples and embodiments of the present disclosure some information is provided for context.

In typical prior art sensor devices, the sensor output can be provided as an analog or PWM output. Alternatively, a SPI or 12C interface device can be used, but the sensor data is typically read back on demand by the system controller.

Existing serial interfaces (SPI, 12C) require overhead for addressing and read/write operation. Such prior sensor devices may in some cases allow for rapid scan times of many sensors in a sensor array but only at the cost of significant hardware requirements, e.g., through use of a large MCU with many ADC resources, multiple channels to read sensors, multiplexors on the board to switch signals, etc.

For prior art sensor arrays, when reading or "scanning" measurement data from multiple sensors, it is often a system design requirement for the system controller to read the data from the multiple sensors within a short time. Such a design constraint typically requires sensor arrays systems to employ significant computational power, e.g., high-speed processors capable of many million instructions per second (MIPS), and system resources like high-speed analog-to-digital-converters (ADCs). Both approaches drive up system complexity and cost and can introduce issues related to high-clock speeds, e.g., transient signals, phase noise, and jitter.

In contrast with prior art sensor arrays, examples and embodiments of the present disclosure can utilize sensor interrupts to a microcontroller with an architecture to trigger other sensors devices in a grouping in order to quickly gather sensor data. Once data is available, a serial interface can allow rapid serial data output ("RSDO") to the system controller according to an RSDO protocol. See for example the applicant's co-owned U.S. Pat. No. 11,894,844, issued Feb. 6, 2024, and entitled "Rapid Data Transfer Sensor Arrays," the entire content of which is incorporated herein by reference.

The RSDO protocol allows for streaming data from a sensor array to a microcontroller without requiring the overhead of addressing multiple chip-select lines. The RSDO protocol can do so by providing a sensor interrupt configuration/architecture that allows for simpler system hardware and firmware in order to read data quickly from a large number of sensors.

The RSDO interface is, however, an output-only communication mode specifically designed for efficiently reading multiple sensors connected in a so-called "daisy-chain" configuration. Due to its output-only nature, once a prior art device employing the RSDO interface is set in the RSDO mode, the SPI communication mode is no longer available. Prior to the present disclosure, selection of the RSDO mode would restrict the operation of the part employing the RSDO interface to a fixed configuration which could not later be modified.

To elaborate on the RSDO protocol functionality: when a falling edge is detected on the chip-select (CSN) pin, a conversion process is initiated. During this process, the chip-select line is maintained at ground level (GND) and the serial data clock (SCLK) line is held high until the conversion is complete. The RSDO protocol utilizes a shift register mechanism to read the data from the chain of sensors. The input pin of the shift register is the serial data in (MOSI or SDI) pin, while the output pin is serial data out (MISO or SDO). The SCLK pin is employed to control when the data is clocked into the shift register and during this process the CSN line is held high. This shift register approach ensures precise and efficient data handling.

In a production environment, where multiple sensors are interconnected in a daisy-chain configuration, the RSDO protocol emerges as an ideal solution for efficient data handling. However, there arises a need to reconfigure parts within this setup. By activating a protocol switch (switching mechanism, a.k.a., "backdoor") in accordance with the present disclosure, it becomes feasible to switch (e.g., temporarily) from RSDO mode to SPI communication. This transition allows for the reconfiguration of multiple devices (e.g., sensor ICs) connected in daisy chain, using the SPI protocol. Once the necessary configurations are completed, the system can seamlessly revert to the RSDO mode for regular operation. Aspects and embodiments of the present disclosure include such a backdoor mechanism (protocol switch) significantly enhancing the functionality of RSDO-based sensor systems. It not only ensures the efficient collection of data in the RSDO mode but also provides the necessary flexibility for reconfiguration without additional hardware requirements.

FIG. 1 is a block diagram of an example sensor array 100 employing RSDO backdoor mechanisms, in accordance with the present disclosure. Sensory array 100 can include a controller (e.g., microcontroller unit or "MCU") 110 and multiple sensor devices (e.g., sensor ICs) 120(1)-(N). In example embodiments, the sensor devices 120(1)-(N) can be configured in a serial daisy-chain configuration, as shown. Sensor array 100 may be configured for manual and/or automatic polling of the sensor devices 120(1)-(N) for data readback to controller 110. The sensor ICs 120(1)-(N) each include a backdoor switch/mechanism, shown as 150(1)-(N), which allow the sensor ICs 120(1)-(N) to transition from the RSDO mode back to the standard SPI mode.

As shown, controller 110 includes an ST/DN pin 112, a serial-data-in (SDI) pin 114, an SCLK pin 116, and a serial-data-out (SDO) pin 118. The controller ST/DN pin 112 can include or be configured from a chip-select (nCS or CSN) and/or GPIO pin, in some examples. Each sensor device 120 can have a ST/DN pin 122, an SDI pin 124, a clock (SCLK) pin 126, and an SDO pin 128. The controller ST/DN pin 112 can be connected to the ST/DN pin 122 of each device 120 by ST/DN line 115, as shown. A pullup resistor 113 may be present, as shown, e.g., to bias ST/DN line 115 to a high state. The SDO pin 128 of one sensor device, e.g., sensor device 120(1) (the sensor device closest to the controller 110 along the sensor data flow path) can be connected to the SDI pin 114 of the controller 110 by serial data line 117, as shown. The SDI pin 124 and SDO pin 128 of adjacent sensor devices can be connected by serial data lines 125, as shown. The SDI pin 124 of one sensor device, e.g., sensor device 120(N) (the sensor device furthest from the controller 110 along the sensor data flow path) can be connected to the SDI pin 118 of controller 110, e.g., for configuring the sensor array in a rapid serial data out (RSDO) mode of operation. As noted previously, one or more of the sensor devices may include an internal timer, e.g., for waking the device for automatic measurement and/or polling.

The backdoor switches/mechanisms 150(1)-(N) allow the sensor ICs 120(1)-(N) to transition from the RSDO mode back to the standard SPI mode after a triggering command/signal provided by the system microcontroller 110.

Figure 2:
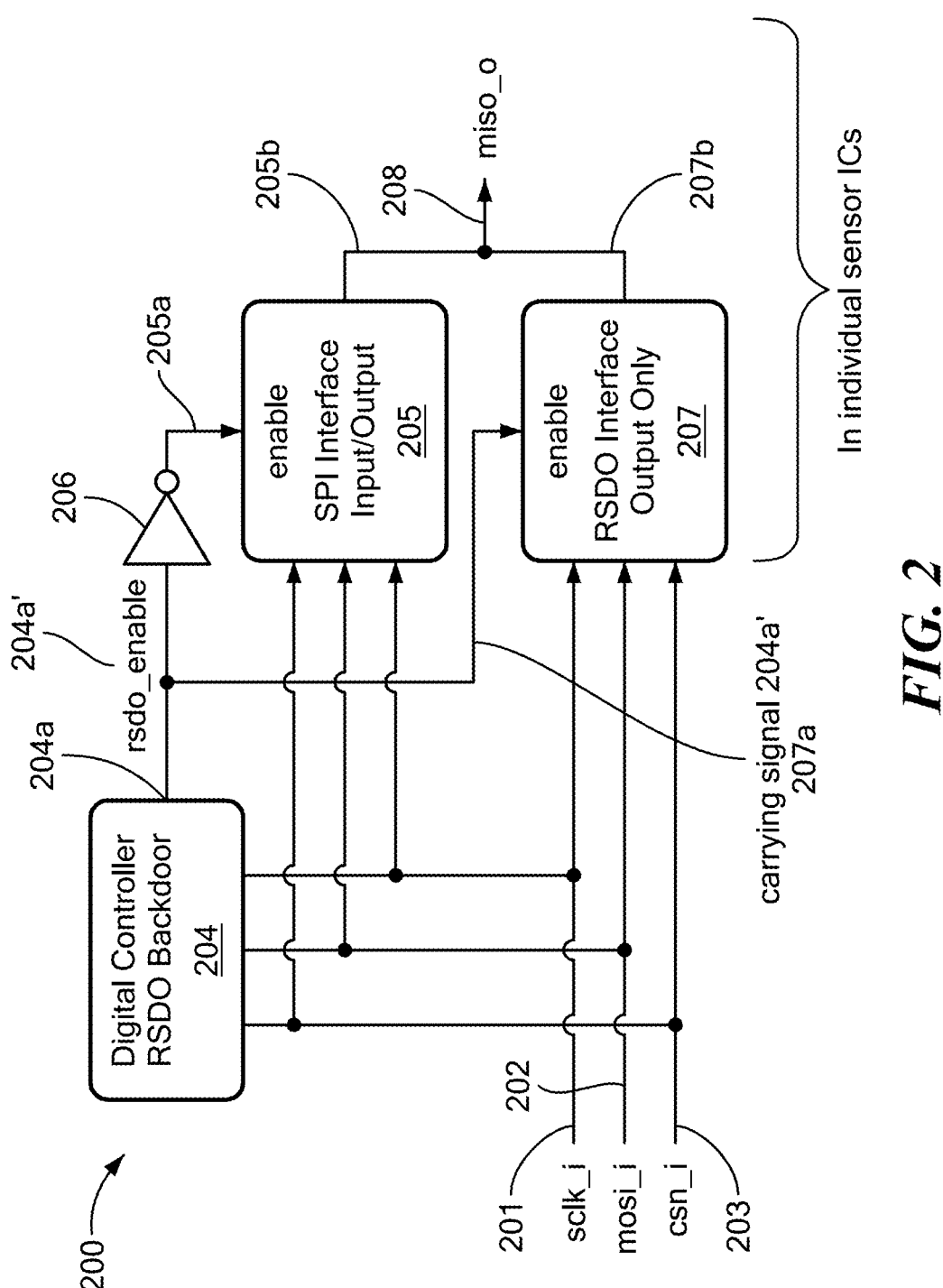
FIG. 2 is a block diagram of an example rapid serial data out (RSDO) backdoor switch mechanism, in accordance with the present disclosure.

FIG. 2 is a block diagram of an example rapid serial data out (RSDO) protocol switching mechanism 200, in accordance with the present disclosure. Mechanism 200 (a.k.a., "RSDO backdoor") can be employed in a sensor IC and is shown including as inputs a serial clock (SCLK) line 201 (with corresponding signals), a serial data in (SDI) line 202 (with corresponding signals), and chip select (CSN) line 203 (with corresponding signals). A digital controller 204, e.g., internal digital logic that enables the SPI or RSDO protocol is also shown, which receives lines 201-203, and can produce (output) an RSDO enable signal 204a' on an output line 204a. An RSDO interface (output only) block 207 is present and receives input lines 201-203 and the RSDO enable signal 204a'. Mechanism 200 includes an SPI interface (input/output) block/module 205, which can be configured to receive an enable signal on an input line 205a. As shown, an inverter 206 can be configured between controller 204 and SPI interface block 205 such that an enable signal on output line 204a (enabling RSDO interface block 207) will be received as a disable (non-enable) signal at SPI interface block 205. Mechanism output 208 produces either an RSDO output 207b or an SPI output 205b depending on which interface has been enabled. An external system controller (e.g., system controller 110 in FIG. 1) can be connected to the sensor IC through input signals 201, 202 and 203 and output signal 208 (for a single device); if multiple devices (sensor ICs) are configured in a chain (e.g., as shown in FIG. 1.) output 208 would go to the 202 input of the next device in the chain or to the system controller, depending on the position of the particular device in the chain. Switch mechanism 200 can accordingly be used to switch the protocol used for the related sensor IC.

Switch mechanism 200, when included in each sensor IC of an RSDO sensor array, can operate to allow the RSDO sensor array (e.g., sensor array 100 of FIG. 1) to switch between an RSDO mode (protocol) and a standard SPI mode (protocol). This mechanism 200 thus allows for a seamless transition from the RSDO mode back to the standard SPI mode for the sensor ICs of the array. The transition can be triggered by lowering the SPI lines to zero for a predetermined duration, e.g., as controlled by system controller 110 in FIG. 1. This event (a null or zero state existing for a predetermined time) is recognized by the digital controller 204 (internal to a sensor IC), which then facilitates the mode switch, e.g., by producing an RSDO enable signal 207a', as described in further detail below for FIG. 3.

Figures 3, 4:
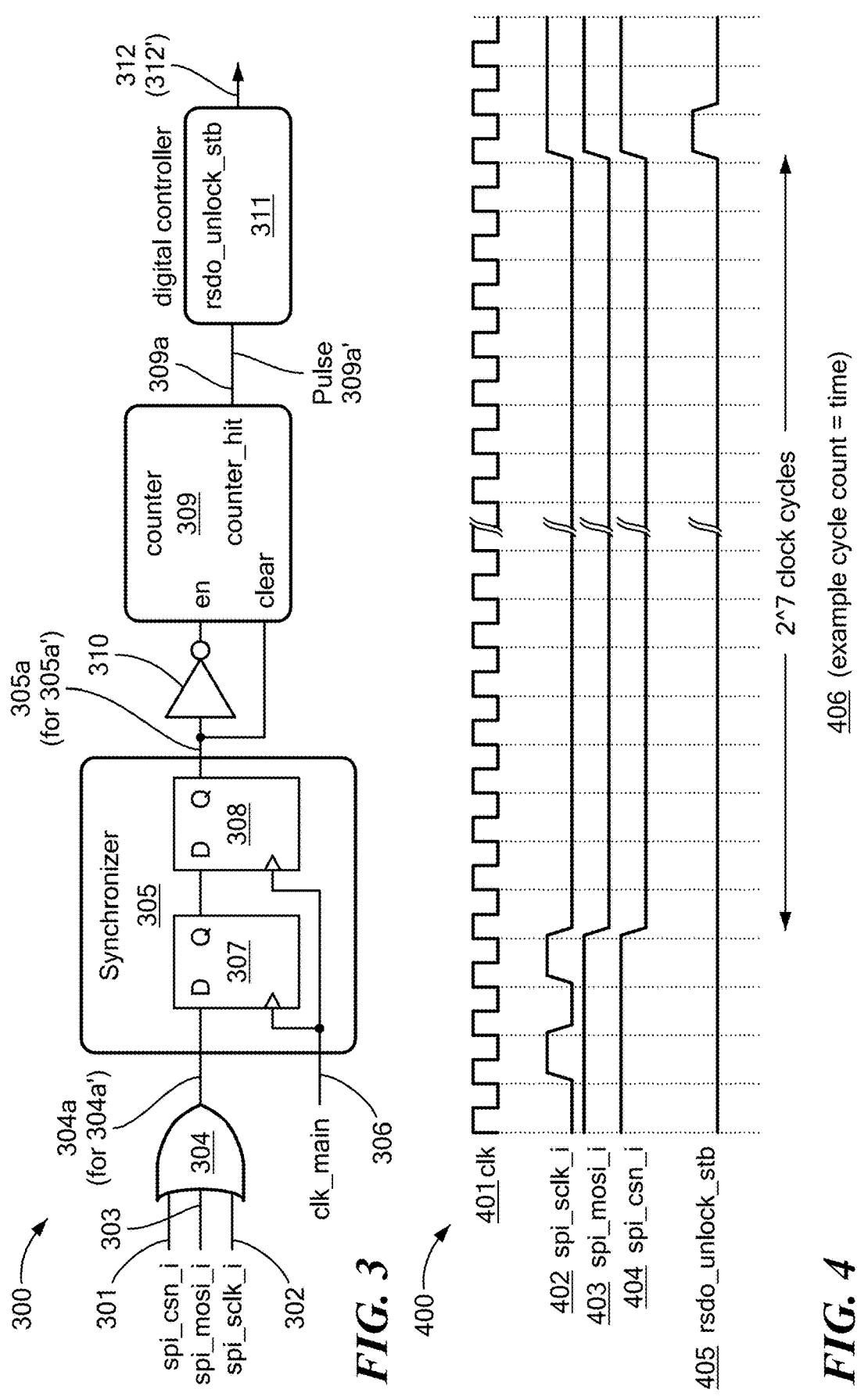
FIG. 3 is a block diagram of components of an example RSDO backdoor mechanism, in accordance with the present disclosure.
FIG. 4 is an example timing diagram with RSDO waveforms, in accordance with the present disclosure.

FIG. 3 is a block diagram of components of an example RSDO backdoor mechanism 300, in accordance with the present disclosure. Backdoor mechanism 300 is shown including input lines 301-303 for chip select signals (CSN), serial data input signals (SDI), and system clock signals (SCLK), respectively (for either of the RSDO or SPI interfaces). Mechanism 300 includes an OR gate 304 that is configured to receive lines 301-303 and has an output line 304 on which it can produce or output an output signal 304a'.

Mechanism 300 further includes a synchronizer 305, which is configured to receive the output signal 304a' from OR gate 304 and a system clock signal on a main clock input 306. Synchronizer 305 can include first and second flip-flops (latches) 307-308 as shown and has an output line 305a for output signal 305a'. A counter 309 is shown receiving output signal 305a' from the synchronizer 305 on an enable line after the signal has been inverted by an intervening inverter 310. Counter 309 is configured with output line 309a to produce an output signal 309a' when a counter value has been reached-after true condition necessary for the OR gate 304 persists or has been satisfied for (at least) the predetermined duration. Counter 309 can be connected to an unlock strobe block 311, e.g., a digital controller, which may have an output line 312 for an output signal 312, e.g., an RSDO unlock signal or an SPI-(re)enable signal, for switching from an RSDO mode to an SPI mode of operation, as described in further detail below.

To initiate the backdoor mechanism 300, the three input signals of the RSDO/SPI interface (CSN, SDI/MOSI and SCLK) are set to zero. These three signals converge at OR gate 304. This configuration ensures that all signals are in a zero state to trigger the backdoor counter 309. The output from this OR gate is then synchronized by synchronizer 305 with the system clock (which receives the clock signal on input line 306) to mitigate any potential cross-domain crossing issues. This synchronized output 305a', once negated (by inverter 310), activates timer (counter 309), which governs the minimum duration required to engage the backdoor mechanism 300 effectively. Upon satisfying this predetermined duration (e.g., upon reaching a preset count), a pulse is generated on the "rsdo_unlock_stb" signal line, thereby signaling the digital controller 312 to transition from RSDO mode to SPI mode, e.g., by producing an RSDO enable signal. This transition, as demonstrated in the waveform patterns of FIG. 4, effectively concludes the backdoor activation process. Instead of the two latches shown (307 and 308), in other embodiments, the synchronizer 305 may have a different number of latches (e.g., one, three, etc.). Moreover, other embodiments may omit use of the inverter 310 and/or synchronizer 305, e.g., using appropriate connections.

FIG. 4 is an example timing diagram 400 with SPI/RSDO waveforms, in accordance with the present disclosure. As shown, these include an internal system clock (CLK) waveform 401 (referring to the internal oscillator of the sensor device), an SPI clock waveform (SPI_SCLK_I or SCLK) 402 (referring to the SPI clock waveform generated by the external microcontroller), a serial data in (SPI_MOSI_I or SDI) waveform 403, a chip select (SPI_CSN_I or CSN) waveform 404, and an RSDO unlock strobe (RSDO_UN-LOCK_STB) waveform 405.

As mentioned previously, all SPI input signals 402, 403, and 404 are in a zero state to trigger the backdoor counter (FIG. 3). The output from the OR gate is then synchronized with the system clock to mitigate any potential Cross-Domain Crossing issue. This synchronized output, once negated, activates a timer that governs the minimum duration required to engage the backdoor mechanism effectively. FIG. 4 shows a duration of $2^7$ (i.e., 128) clock cycles. As shown, upon satisfying this predetermined duration, a pulse is generated on the RSDO unlock strobe ("rsdo_unlock-_stb") signal line 405, thereby signaling the digital controller (e.g., digital controller 204 in FIG. 2) to transition from RSDO to SPI mode. This transition, as demonstrated in the waveform patterns, effectively concludes the backdoor activation process.

Figure 5:
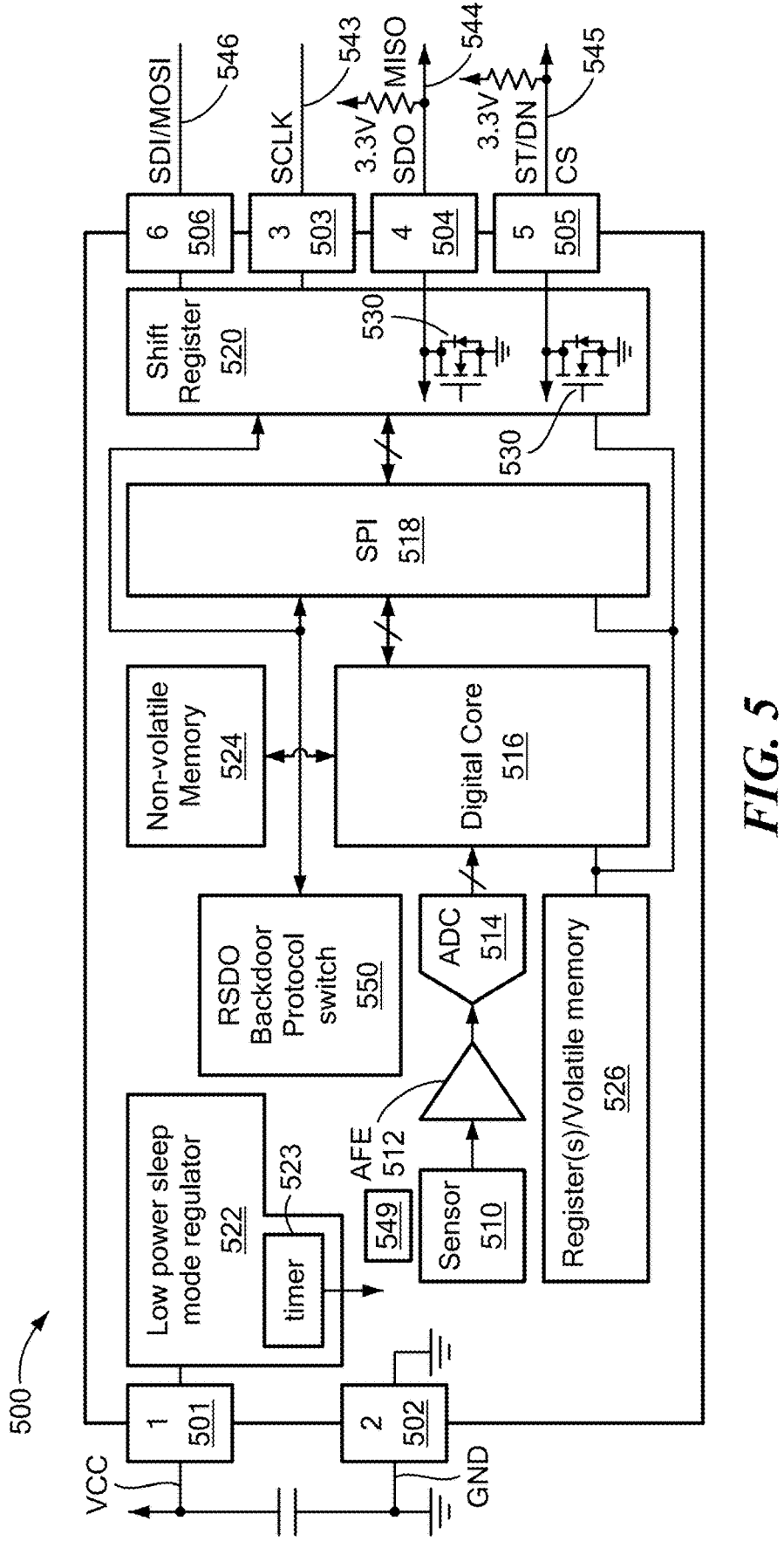
FIG. 5 is a block diagram of an example sensor integrated circuit with RSDO backdoor mechanism, in accordance with the present disclosure.

FIG. 5 is a block diagram of an example sensor integrated circuit (IC) 500 with RSDO backdoor mechanism, in accordance with the present disclosure. Sensor IC 500 can be configurable for multiple modes of operation, including a low-power sleep mode, an active mode, and a serial-data-out mode (SDO or RSDO) for rapid data transfer, and may be used in a sensor array in accordance with the present disclosure. As shown, IC 500 includes a protocol switch 550 for reconfiguring the IC 500 back into SPI mode after have been placed in the RSDO mode.

The sensor IC (sensor device) 500 can include a transducer or sensor 510 (of any suitable types), analog front end (AFE) 512, and an analog-to-digital converter (ADC) 514. Sensor 510 can include any type of sensor and may include multiple sensors; examples include, but are not limited to, magnetic field sensors such as Hall effect sensors and magnetoresistance sensors, temperature sensors, photodiodes, pressure and/or force sensors, accelerometers, and the like. Sensor IC 500 can include digital core 516, e.g., a processor, shift register 520, power regulator 522, non-volatile memory 524, and volatile memory 526. An SPI interface 518 connects digital core 516 to shift register 520. Power regulator 522 can selectively apply power to certain components of sensor IC 500 for a low-power or sleep state of operation, as described in further detail below. Connections/pins are present to supply power, e.g., $V_{CC}$ 501 and ground 502. Sensor IC 500 can include a serial-data-out (SDO) pin 504 and a serial-data-in (SDI) pin 506. SDO line 504 may be connected to SDO line 544, which may be connected to an external device. SDI pin 506 may be connected to SDI line 546, which may also be connected to an external device, e.g., another sensor device, a controller, etc. Sensor IC 500 also includes a bidirectional start/done (ST/DN) pin 505, described in further detail below. Open drain circuitry (switches) 530 are shown for the SDO pin 504 and ST/DN pin 505. ST/DN pin 505 may be connected to ST/DN line 545, e.g., which may be connected to a controller (not shown) and/or other sensor ICs similar to sensor IC 500.

As noted above, the sensor IC 500 is operational to enter into a low-power (sleep) mode. Regulator 522 provides the ability to enter into and out of the low-power sleep mode, e.g., by reducing or eliminating power supplied to all or some of the components of the system 500 except for the shift register 520 (and internal timer 523, when present). Power regulator circuit 522 enables system power savings because the sensor does not have to be ON at all times. Internal timer 523 can periodically wake up the sensor IC 500, e.g., to automatically take a measurement at a particular time. In examples, sensor IC 500 can wake up, perform a measurement, and then go back into sleep mode automatically, e.g., at a rate configured by the end user by a non-volatile memory setting. The end-user may set or program the sleep timer 523, which sets the rate at which the sensor device 500 automatically enters and exits sleep mode. In some examples, e.g., used with controller-initiated polling of the sensor IC 500, internal timer 523 may be omitted. Sensor IC 500 can include an internal oscillator 549 at a suitable location (e.g., as shown or in timer 523 or digital core 516) producing an internal system (CLK) clock signal.

Bidirectional ST/DN pin 505 can be used as both an input and output for the sensor device 500. ST/DN pin 505 can be used to wake up the device 500 from sleep mode on a falling edge, e.g., from a pulldown event on ST/DN line 545. When the ST/DN pin 505 is pulled low—e.g., by an external source such as a controller, or by the IC sensor 500 itself—the transition to the low state signals the sensor IC 500 to wake up from low-power sleep mode and begin a sensor measurement. When the sensor IC 500 is woken up by an ST/DN pin falling edge on the ST/DN line 545 connected to ST/DN pin 505, the sensor IC will enable its own pulldown on the ST/DN pin 505, which will hold the ST/DN line 545 low, until the measurement process has completed. ST/DN pin 505 can be connected to an internal pull-down open drain switch 530 to pull the ST/DN pin 505 low as long as the sensor IC 500 is in an active mode of operation (performing measurements, recording data, etc.).

Once the measurement process is finished, the sensor device 500 releases its pulldown on the ST/DN pin 505. In the absence of any external source pulling down on the ST/DN line 545 (e.g., a controller or other sensor IC), the ST/DN line 545 will transition to a high state. The transition (rising edge) to the high state of the ST/DN line 545 informs the controller (e.g., host MCU) that the measurement process has completed. In example embodiments, a rising edge on the ST/DN line can also internally command the sensor IC 500 to store the resultant data into the output shift register 520 and begin low-power sleep mode entry.

The serial (SPI) interface 518 can allow configuration of the sensor IC 500 through read and write operations to access device registers, e.g., register(s) 526. Sensor IC 500 can be configured to operate in one of multiple modes. For example, sensor IC 500 can be configured to operate in a default mode allowing operation of the sensor IC 500 with bidirectional SPI with read & write instructions. Sensor IC 500 may additionally or alternatively be configured to operate in a serial data out (SDO) mode, e.g., by a user or designer setting specific non-volatile memory settings through SPI writes to the device. Once configured into serial data out (SDO) mode, sensor IC 500 will store resultant data into shift register 520 to be read out by a system controller (not shown). In some examples, once rapid serial data out (SDO) mode is entered, the sensor IC may be unable to accept SPI writes (instructions).

Memory 524 can be used to configure the sensor 500 into serial data out (SDO) mode, e.g., from a default operational mode (bidirectional SPI with read & write). Non-volatile memory 524 can also be used to configure/program the (optional) sleep mode timer 523, and/or the sensor threshold for interrupt, which sets at what measured value the sensor triggers an interrupt on the ST/DN line. Any suitable type of non-volatile memory may be used for memory 524; examples can include, but are not limited to, EEPROM, FLASH, and/or one-time programmable (OTP) memory, or the like.

When configured into rapid serial data out (SDO or RSDO) mode, the sensor device 500 will output data through shift register 520 when commanded to perform a measurement. The data can be stored in the shift register 520 on a rising edge of the ST/DN pin and can be clocked out to the system controller on command. Shift register 520 can operate in both active mode and low-power sleep mode of the sensor device 500. The data output can include a digitized N-bit value (e.g., N-bit digital word) corresponding to the sensor measurement(s), e.g., magnetic field strength (flux density), temperature, current, or other data.

Figure 6:
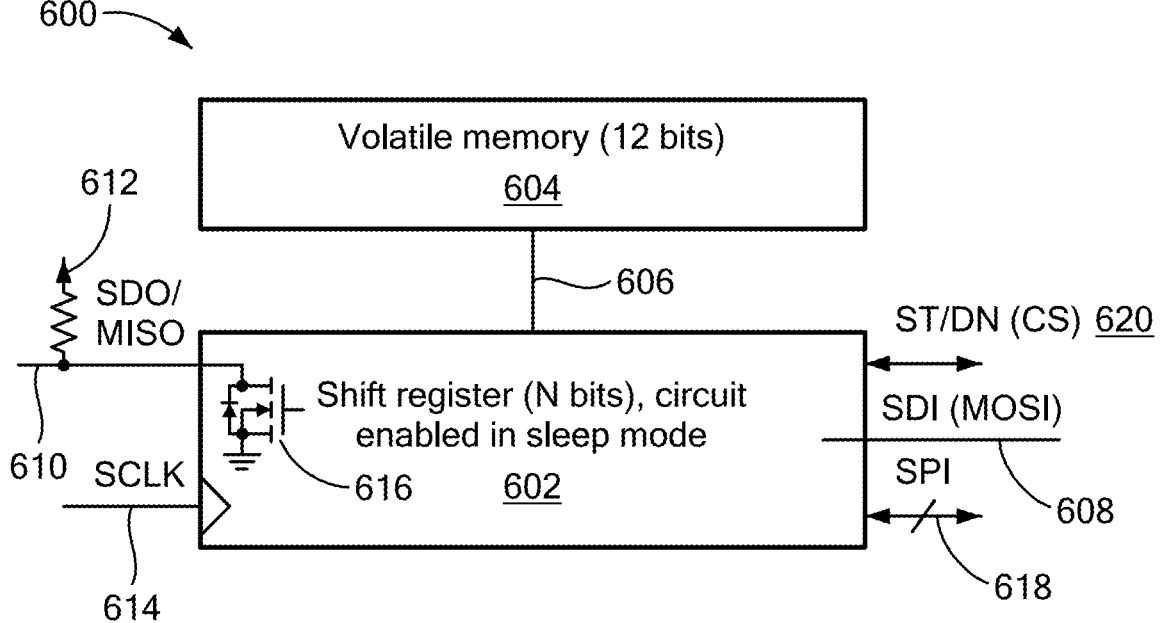
FIG. 6 is a block diagram of example shift register circuitry, in accordance with the present disclosure.

FIG. 6 is a block diagram of example shift register circuitry 600, in accordance with the present disclosure. Circuitry 600 includes shift register 602 connected to example volatile memory 604, e.g., by parallel connection 606. Shift register 602 has a serial-data-in (SDI) line (port) 608 and a serial-data-out (SDO) line (port) 610. SDO line 608 can have a pull-up resister 612, as shown. Shift register 602 also has a system clock input (SCLK) 614. Open drain circuitry (switch) 616 is shown for the SDO line 610. Shift register 602 can include an SPI line 618 and ST/DN line 620, as shown. Shift register 602 may be of any suitable size, e.g., 16 bits, 12 bits, 8 bits, etc.

Shift register 602 can be active while the related sensor IC, e.g., controller 110 of FIG. 1, is in a low-power or sleep mode, allowing a related system controller (e.g., 110 of FIG. 1) to clock out or retrieve data by applying a clock signal to the SCLK pin 614 of shift register 602. On the rising edge of the clock signal provided to SCLK pin 614, the data can be shifted out (on SDO line 610 of register 602) by one bit. A rising edge on ST/DN line 620 can trigger loading of data into the shift register 602 from the volatile memory 604, prior to the related sensor IC (e.g., sensor IC 300 of FIG. 3) entering sleep mode. It should be understood that, while volatile memory 604 is depicted with 12 bits, RSDO can output up to, e.g., 16 bits, in other embodiments.

Figure 7:
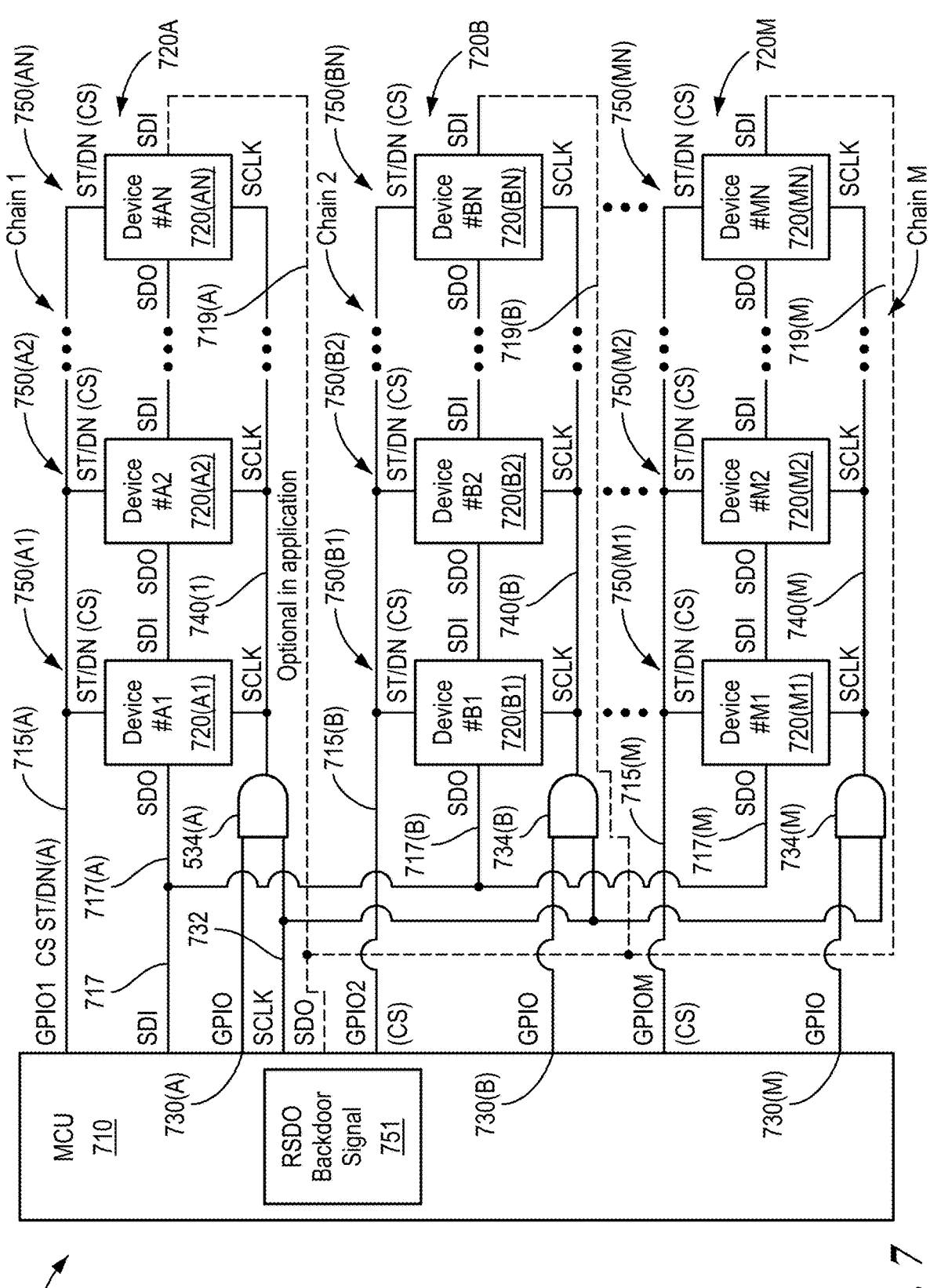
FIG. 7 is a diagram of an example sensor system having a plurality of sensor arrays, in accordance with the present disclosure.

FIG. 7 is a block diagram of an example sensor system 700 having a plurality of sensor chains, in accordance with the present disclosure. System 700 includes controller 710 and a plurality of sensor chains (a.k.a., sensor strings, linear sensor arrays, or 1D sensor arrays) 720A, 720B, . . . , 720M, each having a plurality of sensor devices 720(1)-(N). As shown, each sensor chain can have a daisy chain configuration and can be connected to controller 710 by an ST/DN line 715, and a system clock line (SCLK) 740, similar to as described for sensor array 100 of FIG. 1. For data transfer to the controller 710, each sensor chain (sensor array) can have an SDO pin of one of its sensor ICs connected to an SDI port of the controller 710, as shown by serial lines 717 (shown as common to all sensor chains) and 717(A)-(M). Each sensor array can (optionally) be connected to an SDO pin of controller 710 by a serial data line 719 connected to an SDI pin of one sensor of the array, e.g., for configuration of the sensors into an SDO mode of operation.

Controller 710 can include a GPIO pin 730 (or equivalent) for selectively providing clock signals to each sensor array, respectively. Using the GPIO pin for a particular sensor chain (sensor array) and a corresponding logic element (AND gate) 534, controller 510 can supply a clock signal to the particular sensor array (sensor chain) 520A, 520B, . . . , 520M for reading data stored in the sensors (in internal output registers) of the sensor array. An example of a timing diagram for a sensor array similar to array 500 is described below and shown in FIG. 8.

Figure 8:
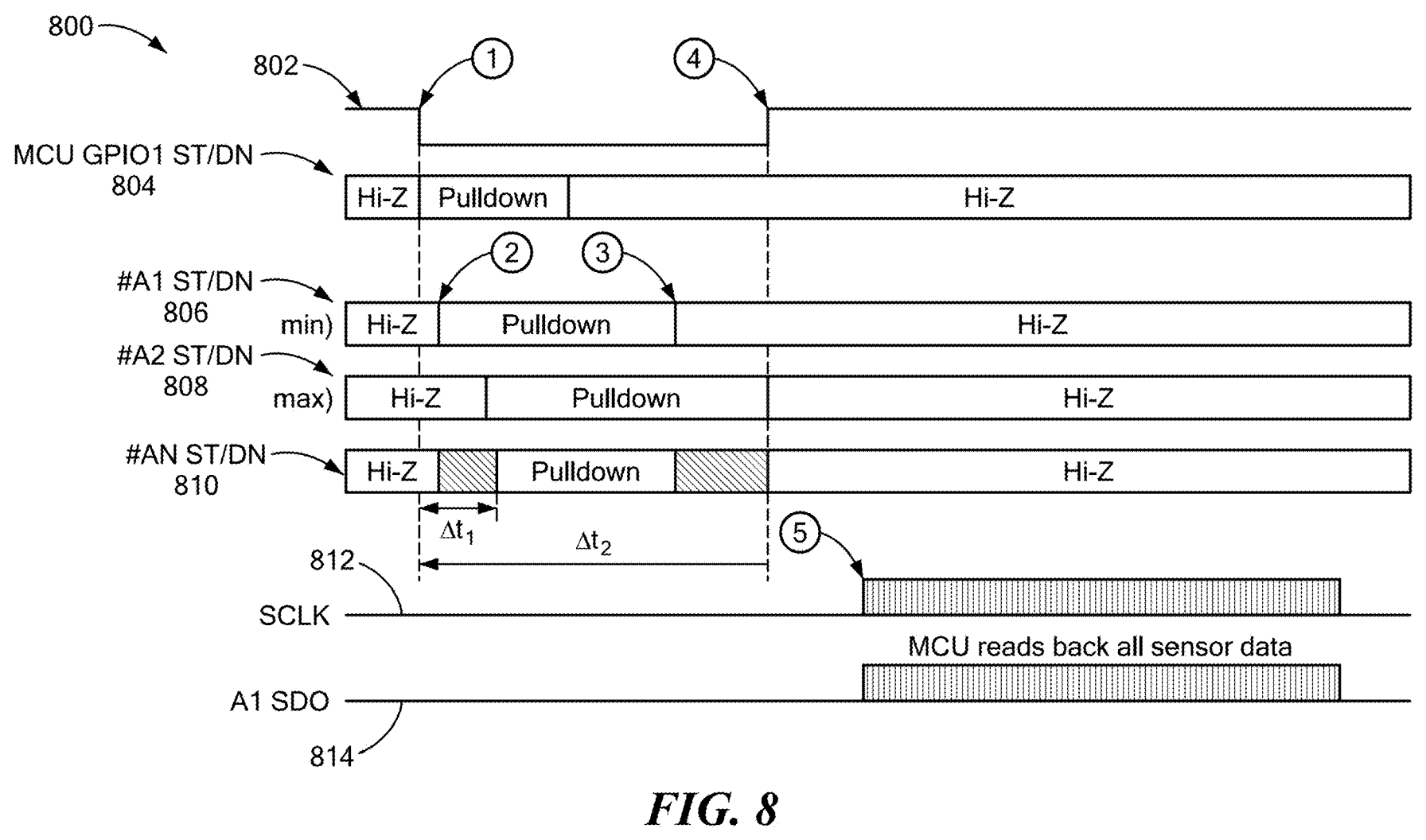

FIG. 8 is a timing diagram 800 illustrating time-multi-plexing of data readback for an example sensor array having three chains of sensor devices, in accordance with the present disclosure. FIG. 8 includes a timing diagram similar to the timing diagram of FIG. 3A (showing a single sensor device) but for a sensor array having a plurality of sensor ICs (sensor devices). The sensor array may be similar to sensor array 100, shown and described above for FIG. 1, as configured for controller-initiated polling of the array sensor devices.

In FIG. 8, the state of the sensor array ST/DN line is shown at 802. The state of the controller ST/DN pin is shown at 804. The state of the ST/DN pins of sensor devices A1, A2, AN are shown at 806, 808, and 810, respectively. The state of the serial or SPI clock (SCLK) line is shown at 812 while the state of the serial data line between the SDI pin of the controller and the SDO pin of the sensor device providing data (shown as A1), e.g., the closest sensor device to the controller on the serial data flow path, is shown at 814. Events 1-5 are shown indicating certain events of the controller-initiated polling, as described in further detail below.

For the example of controller-initiated polling shown, the controller initiates the process by pulling down on its ST/DN pin 804, which simultaneously pulls down the connected ST/DN line 802 (event 1). The ST/DN line is also connected to each of the sensor devices A1-AN in the array. The pull down on the ST/DN line 802 acts as a trigger or command for each sensor device A1-AN to perform a sensor measure-ment (and to wake from the sleep mode if initially in that mode). In response, each sensor device A1-AN of the array will pull down on the ST/DN line 802 by pulling its own ST/DN pin (806, 808, 810) low and then commence per-forming a sensor measurement. Sensor device A1 is shown as the first sensor device to initiate a pulldown on the ST/DN line 802, at event 2, followed by sensors A2 and AN.

After each sensor device A1-AN completes its measure-ment using its internal transducer/sensor, the sensor device releases its pulldown on the ST/DN line, as shown for sensor A1 at event 3. The ST/DN line 802 is held low until all sensor devices A1-AN of the array have completed their respective measurements and the last ST/DN pulldown is released, as shown for sensor device A2 at event 4. When all sensor devices A1-AN have released the ST/DN line 802, the line 802 transitions to a high state, as shown at event 4. The transition of the ST/DN line 802 from a low state to a high state (event 4) signals the controller to apply a clock signal via the SCLK line 812 to the sensor devices A1-AN to read back data from each sensor device (stored in the internal output register), as indicated at event 5.

Even though the pull down (event 1) on the ST/DN line 802 will affect the sensor devices A1-AN as a group at essentially the same time, the sensor devices A1-AN may exhibit timing differences in their respective wake and measurement actions, e.g., due to dimensional, process and/or signal propagation variances, etc. As a result, the respective start and stop times may vary among the sensor devices A1-AN of the array. Time delay $\Delta T_1$ is shown representing the delay between the time the system controller first pulls down on the ST/DN line 802 and the time the last sensor device (shown as AN) pulls down on the ST/DN line 802 in response. Time delay $\Delta T_2$ is shown representing the delay between the time the system controller first pulls down on the ST/DN line 802 and the time the last sensor device (shown as A2) releases its pull down on the ST/DN line 802. The time delays $\Delta T_1$ and $\Delta T_2$ can vary between different sensor devices and/or applications. The time each sensor device pulls down on the ST/DN line 802 can also vary among the sensor devices A1-AN, as shown.

Figure 9:
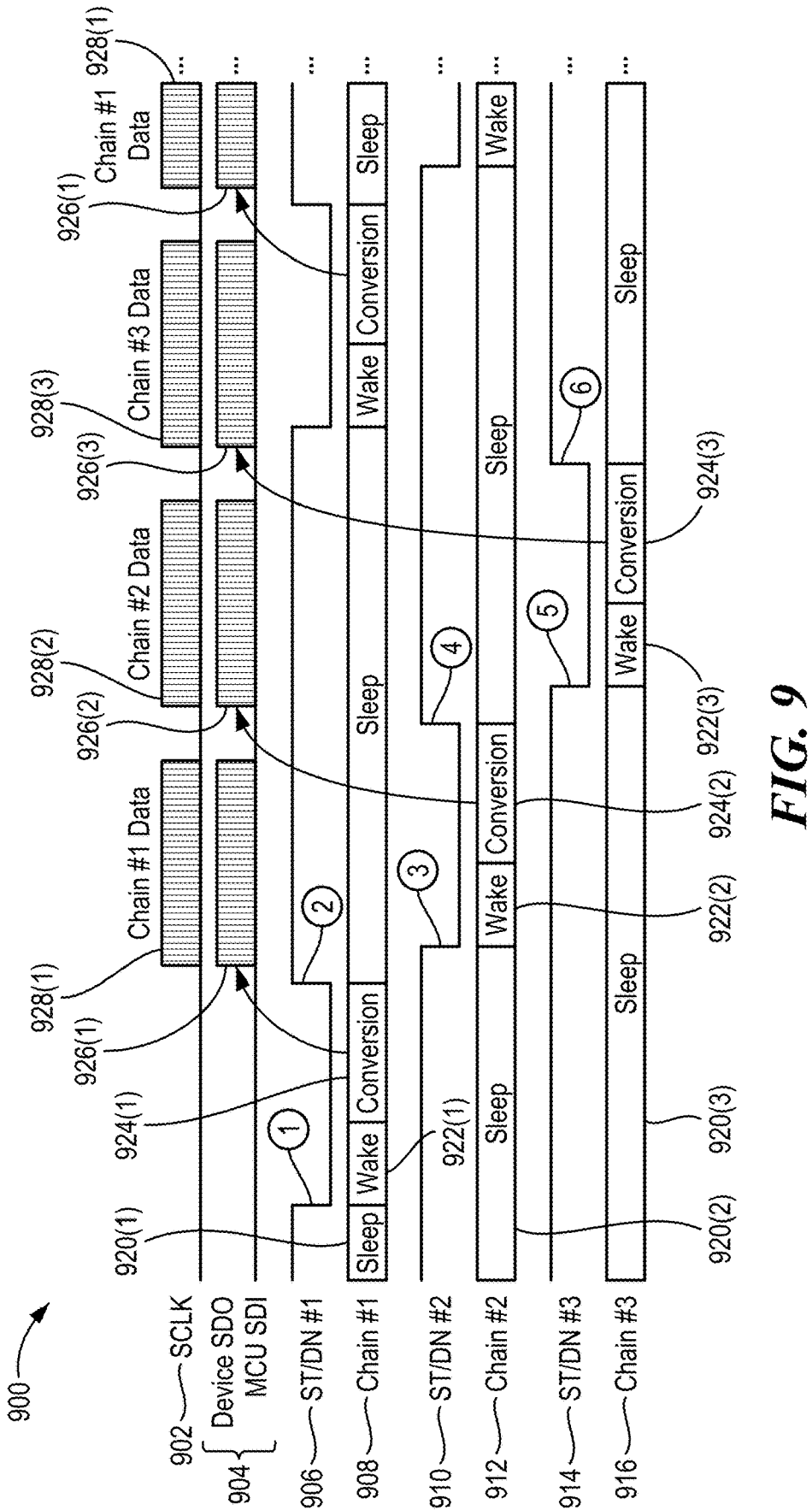
FIG. 9 is another timing diagram illustrating time-multiplexing of data readback for an example sensor array having three chains of sensor devices, in accordance with the present disclosure.

FIG. 9 is a timing diagram 900 illustrating time-multiplexing of data readback for an example sensor array having three chains of sensor devices, in accordance with the present disclosure. In some embodiments, the sensor array may be similar to sensor array 500 of FIG. 5 but with three chains (sensor arrays, sensor strings), i.e., sensor chains 1-3, acting as sub-arrays. States corresponding to the SCLK line and controller-sensor array data (device SDO/MCU SDI) line are shown at 902 and 904, respectively. States for the ST/DN line for each of sensor chains 1-3 are shown at 906, 910, and 914, respectively. States (sleep, wake, data conversion) for sensor chains 1-3 are shown at 908, 912, and 916, respectively. For sensor chain 1, sleep, wake, and data conversion states are shown as 920(1), 922(1), and 924(1), respectively. For sensor chain 2, sleep, wake, and conversion (data) states are shown as 920(2), 922(2), and 924(2), respectively. For sensor chain 3, sleep, wake, and conversion (data) states are shown as 920(3), 922(3), and 924(3), respectively. Transfer of data from sensor chains 1-3 to the SDI pin of the controller is indicated by arrows to the device SDO/MCU SDI line 904.

For the configuration shown, one chain in the sensor array can be commanded to begin a measurement while data from another sensor chain is being read back to the controller. As shown by ST/DN line 906, sensor chain 1 is initially in a sleep state 920(1). The ST/DN line 906 for sensor chain 1 is pulled down (e.g., by a command from the controller or a pull down from an automatic waking sensor device in sensor chain 1), as shown by event 1. All of the sensor devices in sensor chain 1 then enter an active or wake state 922(1) and subsequently take sensor measurements 924(1), the data from which are converted to corresponding digital words, also indicated by 924(1). When finished with sensor measurement, the sensor devices release the ST/DN line 906, at event 2, which triggers transfer of the measurement data to the serial data line 904 and to the controller. Next, a similar process occurs for sensor chain 2 and then for subsequent sensor chain(s), e.g., chain M (the order of which chain is next may be reversed). The process for all of the sensor chains can be repeated, as indicated. Accordingly, by time-multiplexing the operation of each sensor sub-array (1D sensor array, sensor string, or sensor chain), the sensor array (system) can be optimized to minimize scan time and/or power consumption.

FIG. 10 is a block diagram of an example method of rapid serial data transfer 1000 for a sensor array, in accordance with the present disclosure. Method 1000 can include providing a main controller configured to receive serial data, as described at 1002. A first plurality of sensor integrated circuits (ICs) may be provided which are connected in series and configured to wake from a sleep mode and take measurements in an active mode and to provide measurement data to the main controller as serial data, as described at 1004. A protocol switch (backdoor switch) may be provided that is configured to switch a communication protocol mode, used by the main controller and the first plurality of sensor ICs, between a serial peripheral interface (SPI) mode employing an SPI protocol and a rapid serial data output (RSDO) mode employing an RSDO protocol, as described at 1006.

The main controller (or other controller) may be configured to provide a control signal (e.g., a switch signal or command) to each sensor IC to switch functionality from RSDO mode to SPI mode (or vice versa), as described at 1008. For example, the controller may provide the switch signal or command in response to the SPI input lines of a given sensor IC being in a zero (null) state for a predetermined duration (time or clock cycle count), which duration may be programmable or selectable (see FIG. 4). Each sensor IC may include a transducer, a shift register, a serial-data-in (SDI) pin, a serial-data-out (SDO) pin, a bi-directional chip select (CS) pin, a power regulation circuit configured to selectively supply power for the sleep mode and the active mode, and a clock pin for receiving a clock signal from the controller, as described at 1010.

Figure 11:
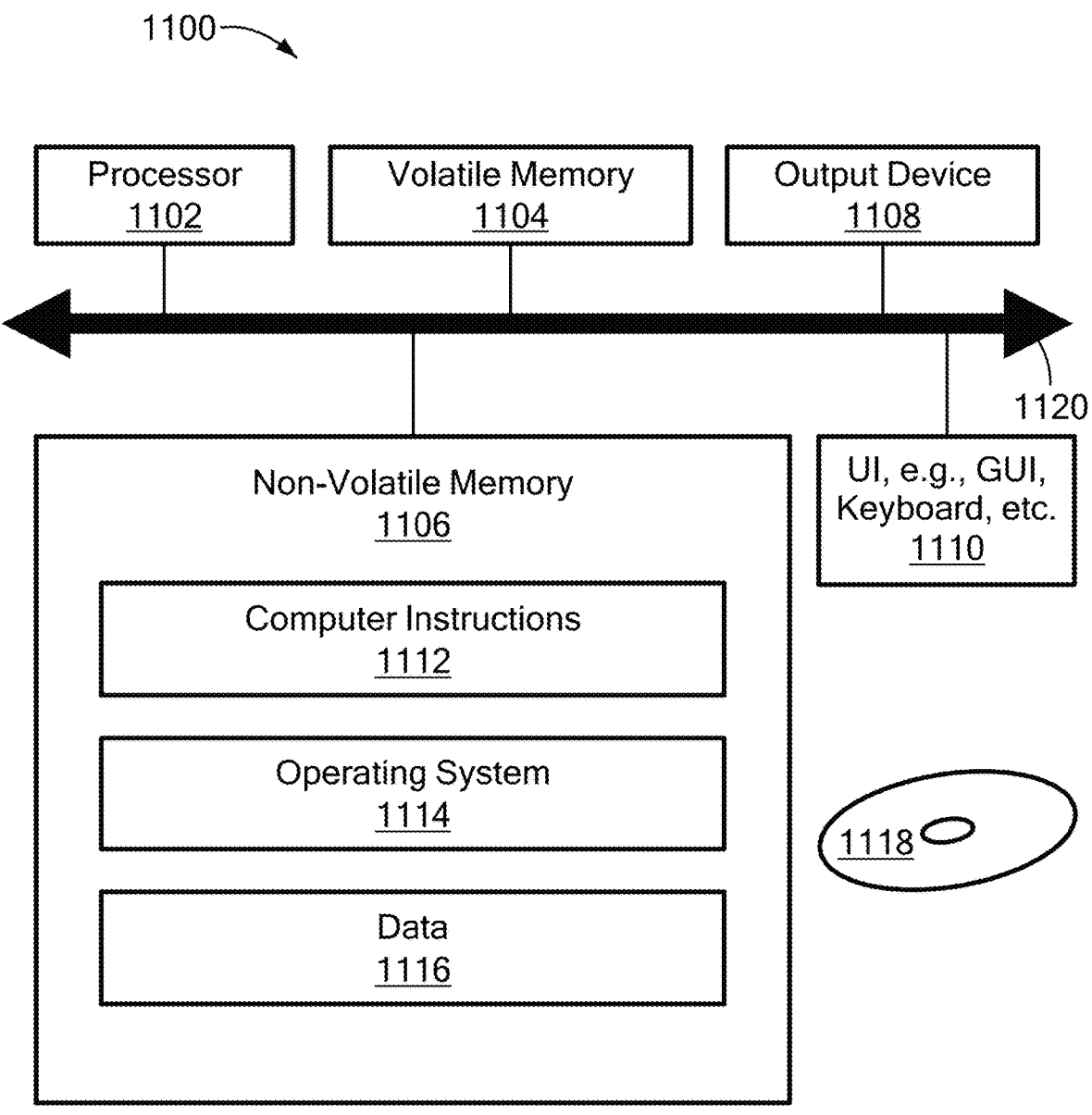
FIG. 11 is a block diagram of an example computer system operative to perform processing, in accordance with the present disclosure.

FIG. 11 is a block diagram of an example computer system 1100 operative to perform processing, in accordance with the present disclosure. Computer system 1100 can perform all or at least a portion of the processing, e.g., steps in the algorithms and methods described herein. The computer system 1100 includes a processor 1102, a volatile memory 1104, a non-volatile memory 1106 (e.g., hard disk, EEPROM, OTP memory, etc.), an output device 1108 and a user input or interface (UI) 1110, e.g., graphical user interface (GUI), a mouse, a keyboard, a display, and/or any common user interface, etc. The non-volatile memory (non-transitory storage medium) 1106 stores computer instructions 1112 (a.k.a., machine-readable instructions or computer-readable instructions) such as software (computer program product), an operating system 1114 and data 1116. In one example, the computer instructions 1112 are executed by the processor 1102 out of (from) volatile memory 1104. In one embodiment, an article 1118 (e.g., a storage device or medium such as a hard disk, an optical disc, magnetic storage tape, optical storage tape, flash drive, etc.) includes or stores the non-transitory computer-readable instructions. Bus 1120 is also shown.

Processing may be implemented in hardware, software, or a combination of the two. Processing may be implemented in computer programs (e.g., one or more software applications) executed on programmable computers/machines that each includes a processor, a storage medium or other article of manufacture that is readable by the processor (including volatile and non-volatile memory and/or storage elements), and optionally at least one input device, and one or more output devices. Program code may be applied to data entered using an input device or input connection (e.g., a port or bus) to perform processing and to generate output information.

The system 1100 can perform processing, at least in part, via a computer program product or software application, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate. Further, the terms "computer" or "computer system" may include reference to plural like terms, unless expressly stated otherwise.

Processing may be performed by one or more programmable processors executing one or more computer programs to perform the functions of the system. All or part of the system may be implemented as special purpose logic circuitry, e.g., an FPGA (field programmable gate array) and/or an ASIC (application-specific integrated circuit). In some examples, digital logic circuitry, e.g., one or more FPGAs, can be operative as a processor as described herein.

Accordingly, aspects, examples, and/or embodiments of the inventive subject matter can afford various benefits relative to prior art techniques. For example, embodiments and examples of the present disclosure can enable or facilitate e.g., combining use of sensor interrupts to a microcontroller with an architecture to trigger other sensors (sensor ICs or sensor devices) in a grouping in order to quickly gather sensor data. Once data is available, a serial interface allows rapid serial data output (RSDO) to the system controller. Switching functionality afforded by embodiments of the present disclosure can allow reversion from an RSDO mode back to an SPI mode, e.g., for (re)configuration of sensor ICs or other devices. Embodiments and examples of the present disclosure can enable or facilitate e.g., a method/structure/circuitry to stream data from a sensor to a microcontroller without requiring the overhead of addressing or multiple chip-select lines. Moreover, embodiments and examples of the present disclosure can enable or facilitate e.g., replacing "scanning" techniques in multi-sensor systems, with a sensor interrupt solution that can allow for simpler system hardware and firmware in order to determine the state (e.g., read measurement data from) of a large number of sensors.

Various embodiments of the concepts, systems, devices, structures, and techniques sought to be protected are described above with reference to the related drawings. Alternative embodiments can be devised without departing from the scope of the concepts, systems, devices, structures, and techniques described. For example, while certain flip-flops have been referenced above and/or in the drawings, e.g., set-reset (S-R) flip-flops, the scope of the present disclosure includes use of other types of flip-flops (latches), e.g., examples/embodiments can include JK flip-flops, data (D) flip-flops, and/or toggle (T) flip-flops with suitable connections.

It is noted that various connections and positional relationships (e.g., over, below, adjacent, etc.) may be used to describe elements and components in the description and drawings. These connections and/or positional relationships, unless specified otherwise, can be direct or indirect, and the described concepts, systems, devices, structures, and techniques are not intended to be limiting in this respect. Accordingly, a coupling of entities can refer to either a direct or an indirect coupling, and a positional relationship between entities can be a direct or indirect positional relationship.

As an example of an indirect positional relationship, positioning element "A" over element "B" can include situations in which one or more intermediate elements (e.g., element "C") is between elements "A" and elements "B" as long as the relevant characteristics and functionalities of elements "A" and "B" are not substantially changed by the intermediate element(s).

Also, the following definitions and abbreviations are to be used for the interpretation of the claims and the specification. The terms "comprise," "comprises," "comprising," "include," "includes," "including," "has," "having," "contains" or "containing," or any other variation are intended to cover a non-exclusive inclusion. For example, an apparatus, a method, a composition, a mixture, or an article that includes a list of elements is not necessarily limited to only those elements but can include other elements not expressly listed or inherent to such apparatus, method, composition, mixture, or article.

Additionally, the term "exemplary" means "serving as an example, instance, or illustration. Any embodiment or design described as "exemplary" is not necessarily to be construed as preferred or advantageous over other embodiments or designs. The terms "one or more" and "at least one" indicate any integer number greater than or equal to one, i.e., one, two, three, four, etc.; though those terms may indicate fractional values greater than one where context admits. The term "plurality" indicates any integer or fractional number greater than one. The term "connection" can include an indirect "connection" and a direct "connection."

References in the specification to "embodiments," "one embodiment, "an embodiment," "an example embodiment," "an exemplary embodiment," "an example," "an instance," "an aspect," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it may affect such feature, structure, or characteristic in other embodiments whether explicitly described or not.

Relative or positional terms including, but not limited to, the terms "upper," "lower," "right," "left," "vertical," "horizontal, "top," "bottom," and derivatives of those terms relate to the described structures and methods as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another, or a temporal order in which acts of a method are performed but are used merely as labels to distinguish one claim element having a certain name from another element having a same name (but for use of the ordinal term) to distinguish the claim elements.

The terms "approximately" and "about" may be used to mean within ±20% of a target value in some embodiments, within plus or minus (±) 10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within +5% of one another in some embodiments, and yet within ±2% of one another in some embodiments.

The term "substantially" may be used to refer to values that are within ±20% of a comparative measure in some embodiments, within +10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

The disclosed subject matter is not limited in its application to the details of construction and to the arrangements of the components set forth in the following description or illustrated in the drawings. The disclosed subject matter is capable of other embodiments and of being practiced and carried out in various ways.

Also, the phraseology and terminology used in this patent are for the purpose of description and should not be regarded as limiting. As such, the conception upon which this disclosure is based may readily be utilized as a basis for the designing of other structures, methods, and systems for carrying out the several purposes of the disclosed subject matter. Therefore, the claims should be regarded as including such equivalent constructions as far as they do not depart from the spirit and scope of the disclosed subject matter.

Although the disclosed subject matter has been described and illustrated in the foregoing exemplary embodiments, the present disclosure has been made only by way of example. Thus, numerous changes in the details of implementation of the disclosed subject matter may be made without departing from the spirit and scope of the disclosed subject matter.

Accordingly, the scope of this patent should not be limited to the described implementations but rather should be limited only by the spirit and scope of the following claims.

All publications and references cited in this patent are expressly incorporated by reference in their entirety.

What is claimed is:

1. A switchable-protocol rapid-data-transfer sensor array comprising:

a controller configured to receive serial data;

a first plurality of sensor integrated circuits (ICs) connected in series and configured to wake from a low-power mode and take measurements in an active mode and to provide measurement data to the controller as serial data;

wherein each sensor IC includes a protocol switch configured to switch a communication protocol mode used by the sensor IC between a rapid serial data output (RSDO) mode employing an RSDO protocol and a serial peripheral interface (SPI) mode employing an SPI protocol; and wherein the protocol switch is configured to switch functionality from the RSDO mode to the SPI mode in response to a control signal from the controller, wherein each sensor IC includes a transducer, a shift register, a power regulation circuit configured to selectively supply power for the low-power mode and the active mode, and an SPI clock (SCLK) pin for receiving an SPI clock (SCLK) signal from the controller, wherein for the RSDO mode, each sensor IC includes a serial-data-in (SDI) pin, a serial-data-out (SDO) pin, a bi-directional chip select (CSN) pin, and wherein the controller is connected to the CSN pin of each of the first plurality of sensor ICs by a first CSN line configured with a pull-up resistor, and wherein the controller is configured to provide a clock signal on the SPI clock (SCLK) pin to initiate serial transfer of data from each of the shift registers of the first plurality of sensor ICs to the respective SDO pins for data transfer to the controller.

2. The sensor array of claim 1, wherein the bi-directional CSN pin is configured to activate the sensor IC from the low-power mode in which the CSN pin is in a high state into the active mode in which the CSN pin is in a low state for a measurement by the transducer, wherein the sensor IC is configured to pull the bi-directional CSN pin to a low state when performing the measurement and to release the bi-directional CSN pin and enter the low-power mode after finishing the measurement, and wherein, when finished with the measurement, the sensor IC is configured to provide measurement data to the shift register for transfer to the controller.

3. The sensor array of claim 1, wherein each of the sensor ICs incudes an internal pull-down open drain switch configured to pull the CSN pin to a low state while the sensor IC is in the active mode.

4. The sensor array of claim 1, wherein the first plurality of sensor ICs are connected in a serial daisy chain configuration.

5. The sensor array of claim 1, wherein each sensor IC is configured to store measurement data in the shift register in response to a transition on the CSN pin from a low state to a high state.

6. The sensor array of claim 1, wherein each sensor IC is configured to receive serial data provided at the SDI pin and, when the SPI clock (SCLK) signal is received on a clock line from the controller, store the serial data in the shift register.

7. The sensor array of claim 1, wherein the power regulation circuit of each sensor IC includes an internal timer configured to wake from the low-power mode based on a timing provided by the internal timer.

8. The sensor array of claim 1, wherein the first plurality of sensor ICs comprises a plurality of sensors.

9. The sensor array of claim 8, wherein the plurality of sensors comprises a plurality of magnetic field sensors.

10. The sensor array of claim 9, wherein the plurality of magnetic field sensors comprises Hall effect elements.

11. The sensor array of claim 10, wherein the Hall effect elements comprise vertical Hall effect elements.

12. The sensor array of claim 11, further comprising a keyboard, wherein the vertical Hall effect elements are configured to detect key-movement of keys of the keyboard.

13. The sensor array of claim 9, wherein the plurality of magnetic field sensors comprise magnetoresistance (xMR) elements.

14. The sensor array of claim 1, wherein the first plurality of sensor ICs comprises one or more temperature sensors.

15. The sensor array of claim 1, wherein the first plurality of sensor ICs comprises one or more current sensors.

16. The sensor array of claim 1, further comprising a second plurality of sensor ICs connected in series and configured to periodically take measurements and provide measurement data to the controller as serial data.

17. The sensor array of claim 1, wherein the controller is configured to activate one of the sensor ICs from the low-power mode to the active mode by pulling down the CSN line.

18. The sensor array of claim 1, wherein each sensor IC is further configured to, when a sensor measurement threshold is exceeded, to pull the CSN pin to a low state for a fixed amount of time before releasing the CSN pin and entering the low-power mode.

19. The sensor array of claim 1, wherein the protocol switch comprises:

a logic gate configured in the RSDO mode to receive a chip select (CSN) signal from a chip select (CSN) line, an SPI clock (SCLK) signal from an SPI clock (SCLK) line, and a serial-data-in (SDI) signal from an SDI line as inputs, and provide an output indicative of a low state on all three lines;

a synchronizer configured to receive the output of the logic gate and a system clock (CLK) signal, wherein each sensor IC includes an internal oscillator configured to produce the system clock (CLK) signal, and produce a synchronizer output signal; and a counter configured to receive the synchronizer output signal after being passed through an inverting input, and produce a counter output signal when a true condition for the logic gate persists for a specified counter value;

wherein the controller is configured to receive the counter output signal and, in response, produce a control signal to switch the protocol used by the first plurality of sensor ICs from the RSDO protocol to the SPI protocol.

20. The sensor array of claim 19, wherein the counter is configured to produce the counter output signal in response to the CSN, SDI, and SCLK signals being at zero for a predetermined duration.

21. A method of making a switchable-protocol rapid-data-transfer sensor array, the method comprising:

providing a controller configured to receive serial data;

providing a first plurality of sensor integrated circuits (ICs) connected in series and configured to wake from a low-power mode and take measurements in an active mode and to provide measurement data to the controller as serial data; and providing each sensor IC with a protocol switch configured to switch a communication protocol mode used by the sensor IC between a rapid serial data output (RSDO) mode employing an RSDO protocol and a serial peripheral interface (SPI) mode employing an SPI protocol; and wherein the protocol switch is configured to switch functionality from the RSDO mode to the SPI mode in response to a control signal from the controller, wherein each sensor IC includes a transducer, a shift register, and a power regulation circuit configured to selectively supply power for the low-power mode and the active mode, and an SPI clock (SCLK) pin for receiving an SPI clock (SCLK) signal from the controller, wherein for the RSDO mode, each sensor IC includes a serial-data-in (SDI) pin, a serial-data-out (SDO) pin, a bi-directional chip select (CSN) pin, and wherein the controller is connected to the CSN pin of each of the first plurality of sensor ICs by a first CSN line configured with a pull-up resistor, and wherein the controller is configured to provide a clock signal on the SPI clock (SCLK) pin to initiate serial transfer of data from each of the shift registers of the first plurality of sensor ICs to the respective SDO pins for data transfer to the controller.

22. The method of claim 21, wherein the CSN pin is configured to activate the sensor IC from the low-power mode in which the CSN pin is in a high state into the active mode in which the CSN pin is in a low state for a measurement by the transducer, wherein the sensor IC is configured to pull the bi-directional CSN pin to the low state when performing the measurement and to release the bi-directional CSN pin and enter the low-power mode after finishing the measurement, and wherein, when finished with the measurement, the sensor IC is configured to provide measurement data to the shift register for transfer to the controller.

23. The method of claim 21, wherein each of the sensor ICs incudes an internal pull-down open drain switch configured to pull the bi-directional CSN pin to a low state while the sensor IC is in the active mode.

24. The method of claim 21, wherein the first plurality of sensor ICs are connected in a serial daisy chain configuration.

25. The method of claim 21, wherein each sensor IC is configured to store measurement data in the shift register in response to a transition on the CSN pin from a low state to a high state.

26. The method of claim 21, wherein each sensor IC is configured to receive serial data provided at the SDI pin and, when a serial clock (SCLK) signal is received on the SPI clock (SCLK) pin from the controller, store the serial data in the shift register.

27. The method of claim 21, wherein the power regulation circuit of each sensor IC includes an internal timer configured to wake from the low-power mode based on a timing provided by the internal timer.

28. The method of claim 21, wherein the first plurality of sensor ICs comprises one or more sensors.

29. The method of claim 28, wherein the one or more sensors comprise one or more magnetic field sensors.

30. The method of claim 29, wherein the one or more magnetic field sensors comprise one or more Hall effect elements.

31. The method of claim 29, wherein the one or more magnetic field sensors comprise a plurality of vertical Hall effect elements.

32. The method of claim 31, further comprising a keyboard, wherein the plurality of vertical Hall effect elements are configured to detect key-movement of keys of the keyboard.

33. The method of claim 29, wherein the one or more magnetic field sensors comprise one or more magnetoresistance elements.

34. The method of claim 21, wherein the first plurality of sensor ICs comprises one or more temperature sensors.

35. The method of claim 21, wherein the first plurality of sensor ICs comprises one or more current sensors.

36. The method of claim 21, further comprising a second plurality of sensor ICs connected in series and configured to periodically take measurements and provide measurement data to the controller as serial data.

37. The method of claim 21, wherein the controller is configured to activate one of the sensor ICs from the low-power mode to the active mode by sending a polling signal on the CSN line.

38. The method of claim 21, wherein each sensor IC is further configured to, when a sensor measurement threshold is exceeded, to pull the CSN pin to a low state for a fixed amount of time before releasing the CSN pin and entering the low-power mode.

39. The method of claim 21, wherein the protocol switch comprises:

a logic gate configured to receive a chip select (CSN) signal from a chip select (CSN) line, a SPI clock (SCLK) signal from the SPI clock (SCLK) line, and a serial-data-in (SDI) signal from an SDI line as inputs, and provide an output indicative of a low state on all three lines;

a synchronizer configured to receive the output of the logic gate and an internal system clock CLK signal, wherein each sensor IC includes an internal oscillator configured to produce the system clock (CLK) signal; and a counter configured to receive the output of the synchronizer as a counter input signal passed through an inverting input, and produce a counter output signal when a true condition for the logic gate persists for a specified counter value based on the system clock (CLK) signal; and wherein the controller is configured to receive the counter output signal of the counter and, in response, produce a control signal to switch the protocol used by the first plurality of sensor ICs from the RSDO protocol to the SPI protocol.

40. The method of claim 39, wherein the counter is configured to produce the counter output signal in response to the CSN, SDI, and SCLK signals being at zero for a predetermined duration.

* * * * *